United States Patent
Munneke et al.

(10) Patent No.: US 11,547,087 B2
(45) Date of Patent: Jan. 10, 2023

(54) BRUSHING DEVICE AND METHOD FOR BRUSHING AN ANIMAL, AND A SHED

(71) Applicant: LELY PATENT N.V., Maassluis (NL)

(72) Inventors: Harrold Jan Munneke, Maassluis (NL); George Lewis Mikhael Saad, Maassluis (NL)

(73) Assignee: LELY PATENT N.V., Maassluis (NL)

(*) Notice: Subject to any disclaimer, the term of this patent is extended or adjusted under 35 U.S.C. 154(b) by 53 days.

(21) Appl. No.: 16/982,785

(22) PCT Filed: Jul. 12, 2018

(86) PCT No.: PCT/NL2018/050471
§ 371 (c)(1),
(2) Date: Sep. 21, 2020

(87) PCT Pub. No.: WO2019/194674
PCT Pub. Date: Oct. 10, 2019

(65) Prior Publication Data
US 2021/0000076 A1 Jan. 7, 2021

(30) Foreign Application Priority Data
Apr. 5, 2018 (NL) .................................. 2020720

(51) Int. Cl.
*A01K 13/00* (2006.01)
*A01K 1/02* (2006.01)

(52) U.S. Cl.
CPC .............. *A01K 13/002* (2013.01); *A01K 1/02* (2013.01)

(58) Field of Classification Search
CPC ........ A01K 1/02; A01K 13/00; A01K 13/002; A01K 13/004
See application file for complete search history.

(56) References Cited

U.S. PATENT DOCUMENTS

| 2004/0237232 A1* | 12/2004 | Ennis | B60S 3/063 15/53.2 |
| 2007/0000450 A1* | 1/2007 | Otten | A46B 13/001 119/609 |

(Continued)

FOREIGN PATENT DOCUMENTS

| EP | 2 422 617 A2 | 2/2012 | |
| EP | 2422617 A2 * | 2/2012 | ........... A01K 13/004 |

(Continued)

OTHER PUBLICATIONS

International Search Report, issued in PCT/NL2018/050471, dated Jul. 23, 2019.

(Continued)

*Primary Examiner* — Timothy D Collins
*Assistant Examiner* — Maria E Graber
(74) *Attorney, Agent, or Firm* — Birch, Stewart, Kolasch & Birch, LLP

(57) ABSTRACT

A brush device for brushing an animal, in particular the back, head and/or tail of the animal, such as a cow, includes a rotatable brush, as well as an electric drive motor, which is configured to supply a drive torque for rotatably driving the brush in at least one rotation direction. The drive torque supplied by the drive motor is set in such a manner that the brush can be turned back by means of muscular power of the animal and/or an individual counter to the driven rotation direction while said drive torque is being supplied by the drive motor.

14 Claims, 4 Drawing Sheets

(56) References Cited

U.S. PATENT DOCUMENTS

| | | | | |
|---|---|---|---|---|
| 2011/0174234 A1* | 7/2011 | Friberg | ................ | A01K 13/004 |
| | | | | 119/609 |
| 2013/0125828 A1* | 5/2013 | Van Der Poel | ........ | A01K 13/00 |
| | | | | 119/609 |
| 2014/0090607 A1* | 4/2014 | Dole | .................... | A01K 13/001 |
| | | | | 119/609 |
| 2018/0110203 A1* | 4/2018 | Kultanen | ............. | A01K 13/004 |
| 2018/0368360 A1* | 12/2018 | Vasconcelos | ........ | B65D 83/262 |
| 2019/0385332 A1* | 12/2019 | Yajima | ................. | G02B 27/017 |

FOREIGN PATENT DOCUMENTS

| | | | | |
|---|---|---|---|---|
| WO | WO 2009/131439 A1 | 10/2009 | | |
| WO | WO-2009131439 A1 * | 10/2009 | ........... | A01K 13/004 |

OTHER PUBLICATIONS

Written Opinion of the International Searching Authority, issued in PCT/NL2018/050471, dated Jul. 23, 2019.

* cited by examiner

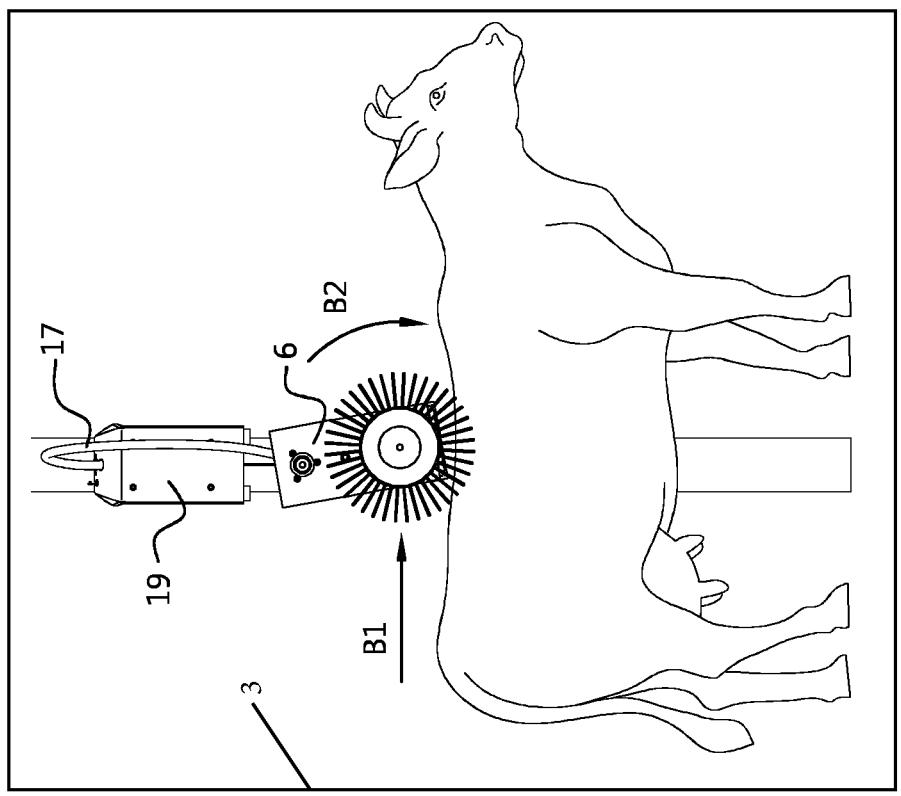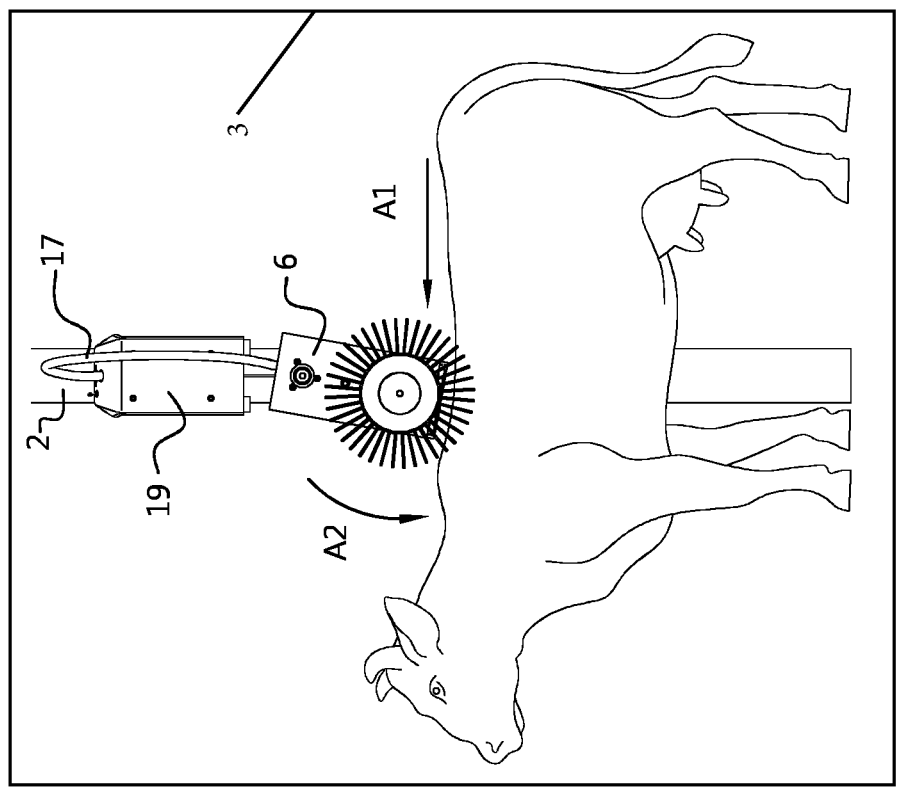

BRUSHING DEVICE AND METHOD FOR BRUSHING AN ANIMAL, AND A SHED

The present invention relates to a brush device for brushing an animal, for example the back, head and/or tail of the animal, such as a cow, in particular a dairy cow.

Cow brushes are well-known. Brushing cows has desired effects, such as biological advantages. The brushing not only cleans the cows, but also reduces the number of parasites and other undesired organisms in the skin of the cows. In addition, it reduces the stress level, which is beneficial for the milk production. Cow brushes can be provided in one or more different locations in an animal shed.

The Luna® cow brush by Lely is known. This cow brush comprises a brush which is rotatable about a substantially horizontal brush axis. The brush is connected to a swivel arm which is suspended so as to be pivotable about a swivel axis which runs substantially parallel to the brush axis. The swivel arm forms a motor housing with an interior space for accommodating an electric drive motor having an output drive shaft and a worm gear transmission which connects the drive shaft to the brush for rotatably driving the latter. The drive motor is a single-phase motor with an on/off switch.

The drive motor is connected to a control system which is provided with a sensor for observing the position of the swivel arm. In the rest position, the swivel arm hangs substantially vertically downwards. If the cow lifts up the brush, the swivel arm pivots upwards from the vertical rest position. After a predetermined delay of approximately 2 seconds, the control system switches on the drive motor. The driven rotation direction of the brush depends on the position of the swivel arm. If the swivel arm swings upwards counterclockwise, the brush is driven clockwise, and vice versa. When the cow no longer engages with the brush and the swivel arm returns to the vertical rest position on account of the force of gravity, the control system switches off the drive motor.

Since the cow may be grasped by its body parts, in particular the tail, or by a collar or identification tag by the rotating brush, which may result in serious injury, for example even amputation of a tail or suffocation, the Luna® cow brush by Lely comprises a slip coupling. If the rotating movement of the brush is blocked by a force exceeding a threshold value determined by the slip coupling, the output drive shaft of the drive motor is able to rotate without transmitting the drive torque to the brush. However, the slip coupling is susceptible to wear, which adversely affects the reliability.

US 2014/0090607 A1 discloses a cow brush having a rotatable brush which, in the rest position, extends substantially vertically, i.e. the brush axis runs substantially vertically. The brush is rotatably drivable by means of a three-phase motor with a frequency controller ("variable frequency drive controller" or "VFD controller"). A motion sensor is connected to the frequency controller for activating the motor if a cow approaches the brush or engages therewith. By means of a transmission device, the motor is connected to an assembly of two shafts which are mutually connected by means of a universal joint. The top shaft is connected to the transmission device. The brush is suspended from the bottom shaft.

The frequency controller controls the electric current supplied to the motor in order to reach a desired speed of rotation of the brush, for example approximately 60 revolutions per minute. If the speed of rotation of the brush drops, for example if the brush becomes clogged with debris, the frequency controller will increase the electric current supplied to the motor in order to increase the drive torque and maintain the desired speed of rotation.

There is also a risk with this cow brush of a tail of the cow, or a collar or identification tag worn by the cow being grasped by the rotating brush, resulting in the brush becoming stuck. For this reason, the frequency controller is configured to stop the rotation of the motor if the electric current supplied to the motor exceeds a predetermined threshold value. Thus, this cow brush comprises an electronic safeguard.

However, the electronic safeguard may also become defective, for example as a result of a malfunction. Therefore, it still cannot be ruled out that a serious injury may be caused if body parts of a cow, in particular the tail, or a collar or identification tag, become trapped during rotation of the cow brush.

It is an object of the invention to provide an improved brush device for brushing an animal, such as a cow, wherein in particular the risk of injury is reduced.

This object is achieved according to the invention by a brush device for brushing an animal, in particular the back, head and/or tail of the animal, for example a cow, such as a dairy cow, comprising:

a rotatable brush, an electric drive motor which is configured to supply a drive torque for rotatably driving the brush in at least one rotation direction, wherein the drive torque supplied by the drive motor is set in such a manner that the brush can be turned back by means of muscular power of the animal and/or an individual counter to the driven rotation direction while said drive torque is being supplied by the drive motor.

According to the invention, the drive motor is designed to supply a relatively small drive torque during operation. During operation, the drive torque of the drive motor remains smaller than the torque which can be produced by means of maximum muscular power by the animal, in particular a cow, and/or an individual in order to rotate the brush in the reverse rotation direction, i.e. counter to the driven rotation direction. The brush may be held stationary by the animal, in particular a cow, and/or by an individual by hand and turned back while the drive motor is actuated. If body parts of a cow, in particular the tail, or a collar or identification tag are grasped by the rotating brush, serious injury, such as amputation of a tail or suffocation, is impossible, as the relatively small drive torque cannot cause such an injury. The cow is able to free itself by pulling itself free and/or a farmer is able to free the cow by turning back the brush by hand counter to the driven rotation direction. Therefore, the brush device with the rotating brush according to the invention is intrinsically safe. In principle, this makes a slip coupling or electronic safeguard as known from the prior art superfluous. At the same time, it was surprisingly found that such a small drive torque is still more than adequate to achieve the desired brush effect. According to the invention, the rotary speed of the brush is, for example, approximately 30 revolutions per minute.

A further advantage is the fact that, due to the relatively small drive torque, according to the invention the risk itself of a tail, collar, tag or another object being carried along by the rotating brush during operation is reduced. Not only is the brush device according to the invention intrinsically safe should a cow accidentally become trapped, but also this will occur less often as a result of the lower drive torque and the correspondingly lower rotary speed of the brush.

According to the invention, it is preferred that the drive torque supplied by the drive motor is smaller, and in particular always remains smaller during operation than 60 Nm, preferably smaller than 50 Nm, in particular smaller than 45 Nm, for example smaller than 40 Nm. Such a drive torque is sufficiently large to rotatably drive the brush and achieve the desired brush effects with a cow while at the same time not being so large as to cause a risk of serious injury if body parts of a cow, in particular the tail, or a collar or identification tag are inadvertently grasped and/or carried along by the rotating brush.

According to the invention, it is preferred that the drive motor is connected to a control system which is configured to observe one or more operating parameters of the drive motor, wherein the control system is configured to control the amount of energy which is supplied to the drive motor during operation on the basis of the observed operating parameter or operating parameters. In contrast with the single-phase motor with on/off-switch of the known Luna® cow brush by Lely, the brush device according to the invention comprises a controllable drive motor. This makes it possible to accurately adjust the performance of the drive.

In this case, it is possible for the drive motor to have a variable speed of rotation, wherein the operating parameter of the drive motor observed by the control system, or one of the operating parameters of the drive motor observed by the control system, corresponds to a speed of rotation of the drive motor during operation, for example to a current speed of rotation or a time-averaged speed of rotation, and wherein a value which corresponds to a desired speed of rotation of the drive motor during operation, which is preferably predetermined, is input and/or stored in the control system, and wherein the control system is configured to compare said operating parameter observed by the control system which corresponds to a speed of rotation to said value and to control the amount of energy which is supplied to the drive motor during operation on the basis of said comparison.

According to the invention, the drive motor may comprise a three-phase motor. The control system comprises, for example, a frequency controller, such as a so-called "variable frequency drive controller" or "VFD controller". The operating parameter of the drive motor which corresponds to a speed of rotation of the drive motor during operation is, for example, the rotary speed of the drive motor. A desired rotary speed may be programmed in the control system, such as 30 revolutions per minute, while, during operation, the current rotary speed of the drive motor is observed and repeatedly or continuously compared to the desired rotary speed. When the observed rotary speed is smaller than the desired rotary speed, for example if a cow presses hard against the brush during brushing and the latter encounters a lot of resistance as a result thereof, the control system increases the amount of energy which is supplied to the drive motor in order to increase the rotary speed to the desired rotary speed. Thus, the rotary speed of the rotating brush is increased or decreased to the set, desired rotary speed during operation. The amount of energy which is supplied to the drive motor may be controlled, for example, by varying the electric current supplied to the drive motor.

According to the invention, it is preferred that the operating parameter of the drive motor observed by the control system, or one of the operating parameters of the drive motor observed by the control system, corresponds to the drive torque supplied by the drive motor, and wherein the control system is configured to switch off the drive motor and/or to reverse the driven rotation direction of the brush determined by the drive motor if said operating parameter which is observed by the control system and corresponds to the supplied drive torque exceeds a predetermined threshold value, preferably only after said predetermined threshold value is continuously exceeded for a predetermined period, in particular 1-3 seconds, such as 2 seconds. As has been explained above, the brush device comprising the rotating brush according to the invention is intrinsically safe, so that in principle no slip coupling or electronic safeguard as known from the prior art or other overload protection is required. Nevertheless, according to the invention, it is preferred that an overload protection is used. If, for example, the tail of a cow is stuck in the brush, this cow may be freed more easily if the drive motor is switched off. When the drive motor is switched off, the brush according to the invention is freely rotatable. Instead of or after switching off the drive motor, the stuck brush may also be turned back slightly by the drive motor in order to facilitate the release of the cow.

In this case, said threshold value is preferably set in such a manner that the drive motor is switched off and/or the driven rotation direction of the brush determined by the drive motor is reversed if, or in particular just before, the drive torque supplied by the drive motor has increased to such an extent that the brush can no longer be turned back by means of muscular power of the animal and/or an individual counter to the driven rotation direction while said drive torque is being supplied by the drive motor. In particular, said threshold value is set such that the drive motor is switched off and/or the driven rotation direction of the brush determined by the drive motor is reversed if the drive torque supplied by the drive motor becomes greater than or, for a predetermined period, in particular 1-3 seconds, such as 2 seconds, is greater than 60 Nm, preferably already 50 Nm, in particular 45 Nm, such as 40 Nm.

According to the invention, the drive motor may be overdimensioned, i.e. in this case, the power of the drive motor is greater than is required in order to supply the set drive torque. However, according to the invention, the drive torque supplied by the drive motor remains so small that the brush can be held stationary by means of muscular power of the cow and/or an individual and turned back without causing serious injury at all times. If the drive torque becomes greater than the threshold value, the overload protection is activated. Although the cow brush according to US 2014/0090607 A1 also comprises an electronic overload protection, this is only activated later, i.e. with this known cow brush, the drive torque is significantly greater, as a result of which the risk of a cow becoming trapped in the rotating brush and/or suffering slight wounds or worse increases.

In an embodiment, the control system comprises a sensor for observing whether an animal engages with the brush, wherein the control system is configured to switch on the drive motor as soon as said sensor has observed that an animal engages with the brush. With the known Luna® cow brush by Lely, the drive motor is only switched on after a predetermined delay of approximately 2 seconds. This may make the cow restless. With the brush device according to this embodiment, the control system switches on the drive motor immediately after the sensor has observed that a cow is in contact with the brush. If a cow engages with the brush, the brush will start to rotate virtually immediately.

Incidentally, the control system according to the invention is preferably programmed such that the drive motor remains switched off for a predetermined waiting period, for example 20 seconds, when the control system has switched off and/or turned back the drive motor after the threshold value for the drive torque was exceeded. Thus, the control system prevents immediate actuation of the drive motor after the overload protection has been activated. As a result thereof, a cow which is stuck in the brush has sufficient time to free itself. While the cow frees itself from the brush, the brush cannot be switched on. At the end of the waiting period, the brush device automatically returns to the normal operating position, in which the drive motor is actuated as soon as it is observed that a cow engages with the brush.

According to the invention, it is preferred that the control system is configured to accelerate the drive motor from a standstill to the desired speed of rotation of the drive motor during operation when the drive motor is being switched on, preferably gradually and/or smoothly, for a predetermined acceleration period which is between 1-5 seconds, for example approximately 3 seconds. In contrast to the known Luna® cow brush by Lely, which has a single-phase motor with on/off-switch, the drive motor from this embodiment is started up gradually. This is advantageous for the service life of the motor and other components, such as the bearings.

According to the invention, it is in addition possible for the control system to be configured to decelerate the drive motor for a predetermined deceleration period, which is between 1-5 seconds, for example approximately 3 seconds, when the drive motor is being switched off. Both the start-up behaviour and the slowing down behaviour of the drive motor may be set to be smooth in order to reduce wear of moving parts.

In an embodiment according to the invention, the brush comprises a driven brush shaft, wherein the drive motor comprises an output drive shaft, and wherein the drive shaft of the drive motor and the brush shaft of the brush are connected to each other by means of a transmission device which is configured such that rotation of the drive shaft can be transmitted to the brush shaft of the brush and vice versa. For example, the transmission device according to the invention comprises a bevel gear transmission, in particular with helical gearing. In the load-free state, the bevel gear transmission is freely rotatable.

During use, the brush is rotatably driven by the drive motor. The drive torque is transferred from the drive shaft to the brush shaft via the transmission device in order to rotate the brush in a driven rotation direction. In contrast to the known Luna® cow brush by Lely, which has a worm gear transmission, the transmission device according to this embodiment of the invention is also suitable to transfer a torque which is applied to the brush by the cow and/or an individual counter to the driven rotation direction, from the brush to the drive shaft via the transmission device. As a result thereof, the resulting drive torque is reduced or cancelled, so that the brush can be turned back and a trapped cow is able to free itself.

In a preferred embodiment according to the invention, the brush is rotatable about a substantially horizontal brush axis. The brush comprises brush hairs which extend substantially radially outwards from the horizontal brush axis. Such a brush runs substantially horizontally, i.e. during use, the cow is situated underneath the brush instead of being situated laterally against the brush, as is the case with the brush known from US 2014/0090607 A1. As a result thereof, the brush effect is significantly improved.

In this case, it is possible for the brush to be suspended from a swivel arm, which is pivotable about a swivel axis which runs substantially parallel to the brush axis, wherein the swivel arm has a rest position, in which the swivel arm extends substantially vertically, and wherein the swivel arm is movable from the rest position by lifting the brush. In the rest position, the swivel arm hangs vertically downwards. The brush extends transversely from the swivel arm. If a cow positions itself under the brush and subsequently lifts the brush upwards, the swivel arm pivots upwards about the swivel axis. This results in an advantageous brush effect.

In a preferred embodiment according to the invention, the drive motor is configured to rotatably drive the brush in both rotation directions, wherein the control system is provided with at least one sensor for observing the pivoting direction of the swivel arm from the rest position during lifting of the brush, wherein said sensor is preferably incorporated in the sensor for observing whether an animal engages with the brush, as described above, and wherein the control system is configured to control the drive motor in order to rotatably drive the brush in the rotation direction counter to the observed pivoting direction of the swivel arm. The sensor detects whether the swivel arm pivots about the swivel axis counterclockwise or clockwise. If the brush is lifted by the cow and the swivel arm tilts in a counterclockwise direction, the control system causes the brush to be rotatably driven in a clockwise direction by the drive motor. On the other hand, the driven rotation direction of the brush is counterclockwise if the swivel arm turns upwards in a clockwise direction when the brush is lifted. As a result thereof, the brush pushes onto the cow on account of its own weight and the brush rotates counter to the action of the force of gravity. This results in a particularly positive brush effect.

According to the invention, it is also possible for the swivel arm to form a motor housing comprising an interior space, in which the drive motor is accommodated. The transmission device may also be arranged in the interior space of the swivel arm. As a result thereof, the swivel arm has an advantageous weight, so that the pressure exerted on the cow by the brush during brushing is deemed to be pleasant.

The control system may partly or in its entirety be arranged in a control cabinet which is attached in a stationary manner, for example to a post or wall in an animal shed. This offers advantages in case of maintenance work. The control system in the control cabinet is connected to the drive motor in the swivel arm, for example by means of one or more cables, such as a power cable and/or data cable.

The invention also relates to an animal shed, in particular for keeping cows, comprising one or more brush devices as described above.

The invention furthermore relates to a method for brushing an animal, in particular the back, head and/or tail of the animal, for example a cow, such as a dairy cow, comprising rotatably driving a rotatable brush in at least one rotation direction by means of a drive torque which is supplied by an electric drive motor, wherein the drive torque supplied by the drive motor is set in such a manner that the brush can be turned back by means of muscular power of the animal and/or an individual counter to the driven rotation direction while said drive torque is being supplied by the drive motor.

The invention will now be explained in more detail by means of an exemplary embodiment illustrated in the figures, in which:

FIGS. 1a and 1b show side views of an animal shed comprising a brush device according to the invention which is used by a cow.

Figure 2:
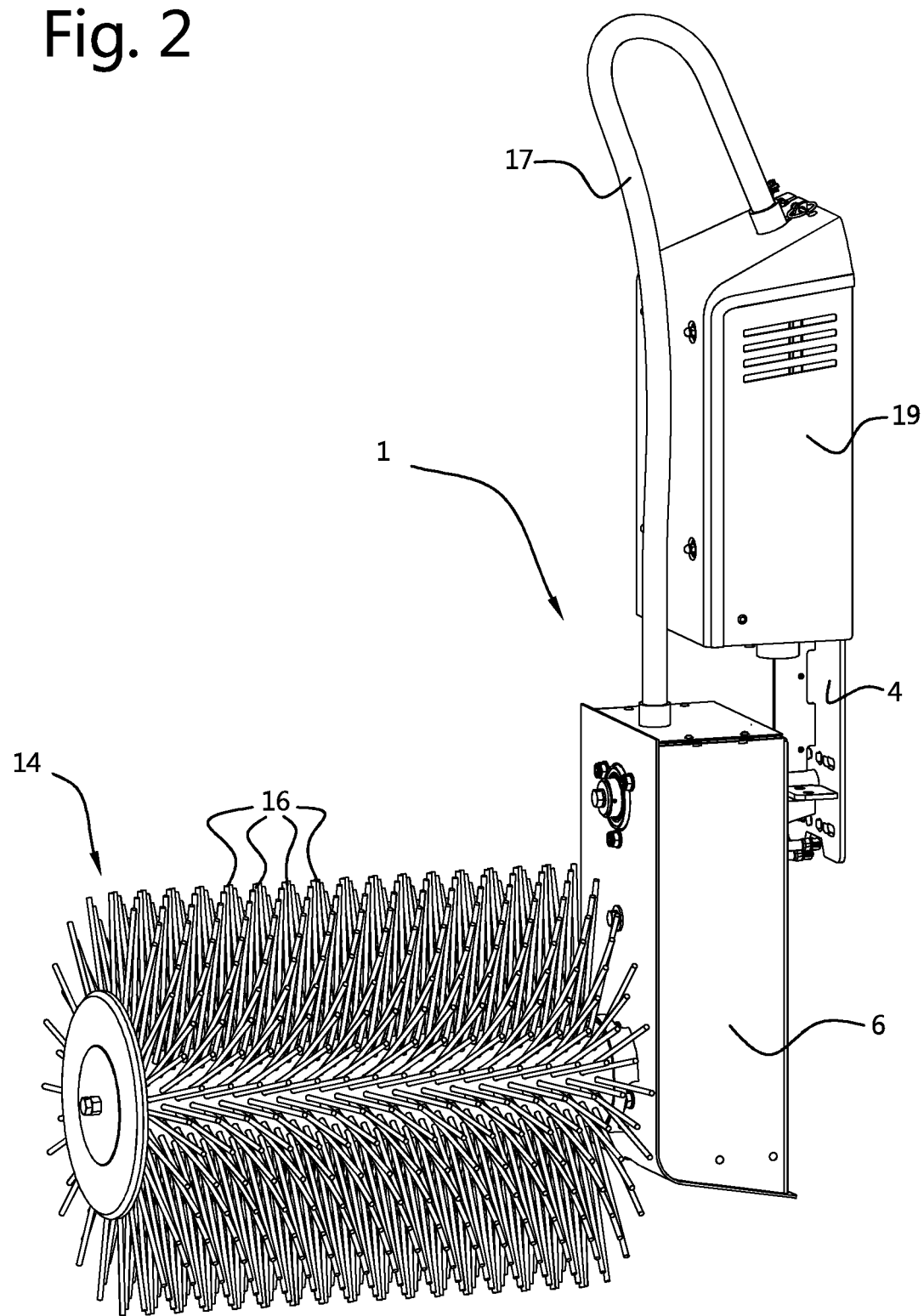
FIG. 2 shows a perspective view of the brush device illustrated in FIGS. 1a and 1b in a rest position.

In the figures, a brush device according to the invention is denoted overall by reference numeral 1. The brush device 1 is configured for brushing a cow, in particular a dairy cow. In this exemplary embodiment, the brush device 1 is arranged on a post 2 in an animal shed 3. Obviously, two or more brush devices 1 may be placed in the animal shed 3, for example also on a wall (not shown).

Figure 3:
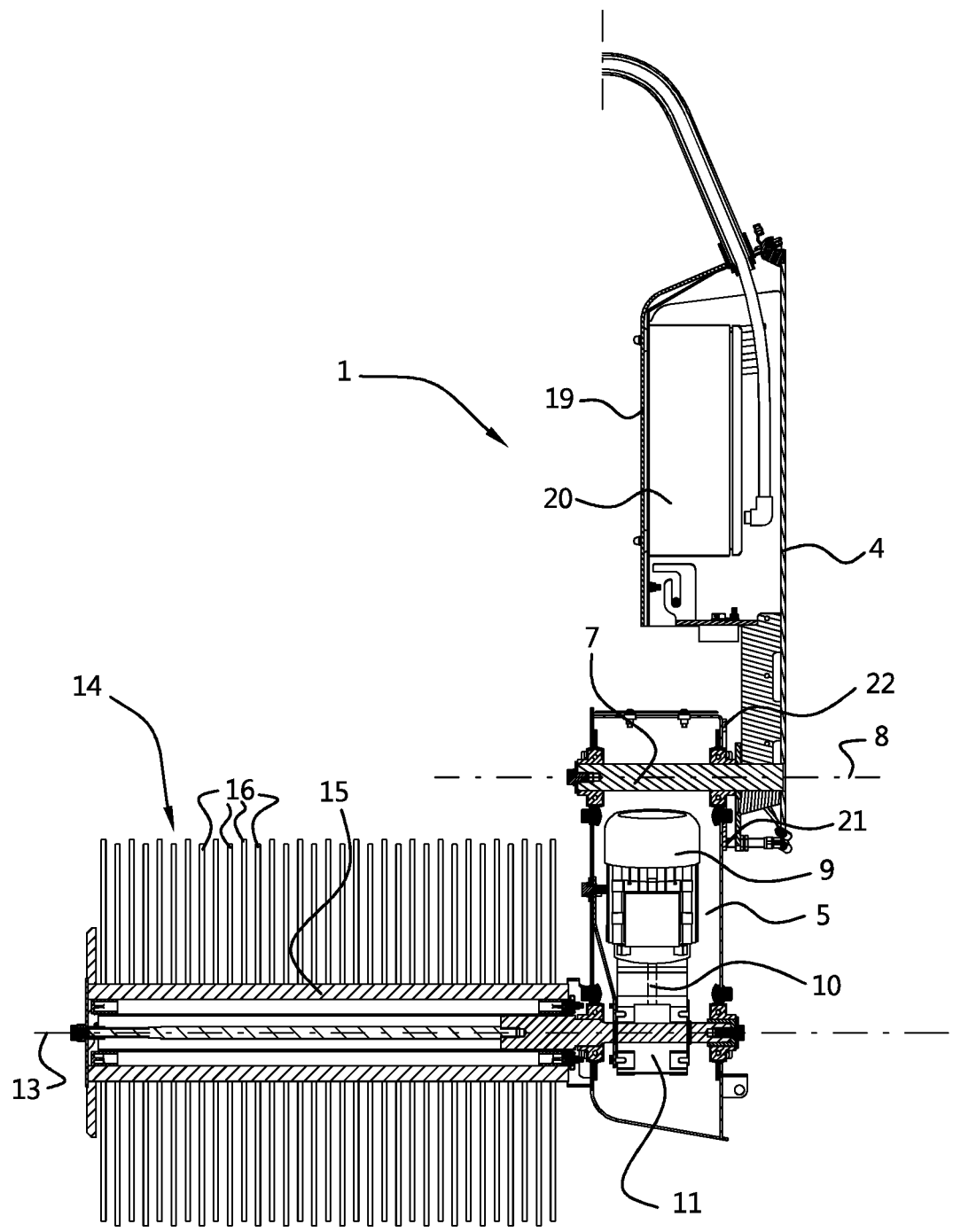
FIG. 3 shows a cross-sectional view of the brush device illustrated in FIG. 2.
Figure 4:
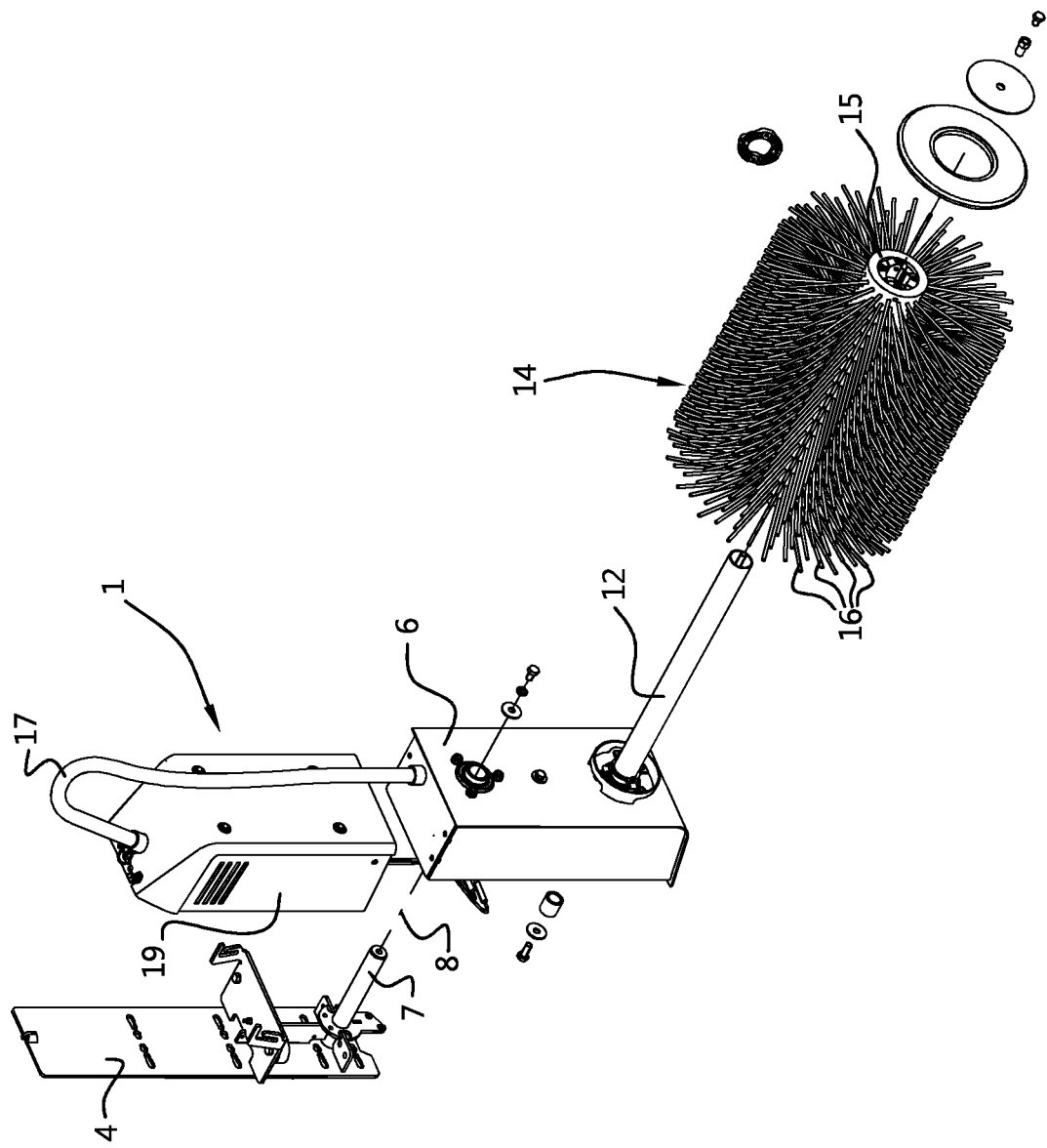
FIG. 4 shows a cut-away view in perspective of the brush device illustrated in FIG. 2.

As shown most clearly in FIG. 4, the brush device 1 comprises a mounting frame 4 which can be screwed onto the post 2. A transversely projecting swivel shaft 7 is attached to the mounting frame 4, from which a swivel arm 6 is suspended so as to be pivotable about a swivel axis 8. The swivel arm 6 forms a motor housing comprising an interior space 5 for accommodating an electric drive motor 9 (see FIG. 3). In this exemplary embodiment, the drive motor 9 is a controllable drive motor with a variable rotary speed, for example a three-phase motor.

The drive motor 9 is connected to a control system 20 by means of a cable 17. The control system 20 is shown diagrammatically in FIG. 3. The control system 20 is accommodated in a control cabinet 19 which is fixedly secured to the mounting frame 4. The control cabinet 19 may be opened to make the control system 20 accessible for repair and maintenance (not shown). In this exemplary embodiment, the control system 20 comprises a frequency controller ("variable frequency drive controller" or "VFD controller") for controlling the drive motor 9 which is configured as a three-phase motor. A desired rotary speed of the drive motor during operation has been input into the control system 20, such as 30 revolutions per minute.

The drive motor 9 comprises an output drive shaft 10 which is connected to a rotatable brush shaft 12 by means of a transmission device 11. Although the transmission device 11 in FIG. 3 is shown diagrammatically, the transmission device 11 in this exemplary embodiment comprises a bevel gear transmission with helical gearing. The transmission device 11 makes it possible to transmit a drive torque from the output drive shaft 10 to the brush shaft 12. In addition, the transmission device 11 is adapted to be turned back. In the load-free state, the output drive shaft 10, the transmission device 11 and the brush shaft 12 are freely rotatable.

The rotatable brush shaft 12 determines a substantially horizontal brush axis 13. The brush axis 13 runs substantially parallel to the swivel axis 8. A brush 14 is fixedly secured to the brush shaft 12. The brush shaft 12 projects transversely from the swivel arm 6. In this exemplary embodiment, the brush 14 comprises a hollow hub 15 which is pushed onto the brush shaft 12. The brush 14 comprises brush hairs 16 which extend radially from the hollow hub 15.

When the brush device 1 is not being used by a cow, the swivel arm 6 is in a rest position, in which the swivel arm 6 hangs downwards substantially vertically on account of the force of gravity (see FIG. 2). If a cow subsequently positions itself underneath the brush 14, the cow pushes the brush 14 upwards. In this case, the swivel arm 6 is pivoted upwards clockwise (see FIG. 1a) or anticlockwise (see FIG. 1b).

The control system 20 comprises one or more sensors 21 for observing the pivoting direction of the swivel arm 6 from the rest position during lifting of the brush 14. The sensors 21 are formed by two distance sensors, in particular eddy current sensors, which are fitted in a stationary manner to the mounting frame 4 and cooperate with an annular strip 22 which is fitted to the rear side of the swivel arm 6 around the swivel shaft 7 (see FIG. 3). In this exemplary embodiment, the sensors 21 for observing the pivoting direction of the swivel arm 6 are also used to observe whether a cow engages with the brush 14.

The control system is configured to switch on the drive motor 9 as soon as the sensors 21 have observed that a cow has lifted the brush 14. In this case, the control system 20 is configured to accelerate the drive motor 9 smoothly from a standstill up to the desired rotary speed of the drive motor 9 during operation for a predetermined acceleration period which, in this exemplary embodiment, is 3 seconds. As a result thereof, the wear of moving parts, such as the transmission 11 and bearings, is reduced.

The drive motor 9 is drivable in two rotation directions, i.e. the drive motor 9 is configured to rotatably drive the brush 14 counterclockwise or clockwise. The driven rotation direction depends on the pivoting direction of the swivel arm 6. The control system 20 is configured to control the drive motor 9 to rotatably drive the brush 14 in the rotation direction counter to the observed pivoting direction of the swivel arm 6.

If the cow pushes the brush 14 away according to arrow A1 in FIG. 1a and the swivel arm 6 is tilted upwards in a clockwise direction, the control system 20 causes the brush to be rotatably driven by the drive motor 9 in a counterclockwise direction (see arrow A2 in FIG. 1a). As is shown in FIG. 1b, the driven rotation direction of the brush 14 is clockwise (arrow B2) if the swivel arm 6 turns upwards in a counterclockwise direction when the brush 14 is pushed away according to arrow B1. As a result thereof, the brush 14 pushes onto the cow on account of its own weight and the brush 14 rotates counter to the action of the force of gravity. This results in a very positive brush effect.

The control system is configured to observe several operating parameters of the drive motor 9. An operating parameter which is observed during operation corresponds to a speed of rotation of the drive motor during operation. In this exemplary embodiment, the current rotary speed during operation is measured continuously. Another operating parameter of the drive motor 9 corresponds to the drive torque supplied by the drive motor 9. Further operating parameters of the drive motor 9 may additionally be observed, such as the supplied motor current, which is representative of the amount of energy which is supplied to the drive motor 9 during operation.

The control system 20 is configured to control the motor current which is supplied to the drive motor 9 during operation on the basis of the observed operating parameters. In this exemplary embodiment, the control system 20 compares the rotary speed of the drive motor 9 to the previously input, desired rotary speed, during operation. The motor current which is supplied to the drive motor 9 during operation depends on said comparison.

If the observed rotary speed is smaller than the desired rotary speed, for example if a cow pushes hard against the brush 14 during brushing and the brush 14 consequently rotates with some degree of difficulty, the control system 20 increases the motor current supplied to the drive motor 9 in order to increase the rotary speed to the desired rotary speed. Thus, the rotary speed of the rotating brush 14 is increased or decreased, during operation, to the set, desired rotary speed.

The drive motor 9 is overdimensioned, i.e. the power of the drive motor 9 is greater than the power required to rotate the brush 14 at the predetermined rotary speed. This is advantageous for the service life of the drive motor 9. However, according to the invention, the drive torque supplied by the drive motor 9 is limited electronically. If the supplied drive torque, which is measured by the control system, continuously exceeds a threshold value for a predetermined period, in this exemplary embodiment approximately 2 seconds, the control system 20 switches off the drive motor 9. Optionally, it is then possible for the control system 20 to cause the brush 14 to perform a revolution or part thereof at a very low speed of rotation in the opposite rotation direction.

According to the invention, said threshold value is in this case set such that the drive motor 9 is switched off before the drive torque supplied by the drive motor 9 becomes so great that the brush 14 cannot be turned back counter to the driven rotation direction by means of muscular power of the cow and/or an individual while said drive torque is being supplied by the drive motor 9. In particular, said threshold value 40 Nm, i.e. the drive motor 9 is switched off if the drive torque supplied by the drive motor 9 is greater than 40 Nm for 2 seconds.

As a result thereof, the brush device 1 with the rotating brush 14 according to the invention is intrinsically safe. The drive torque of the drive motor 9 remains limited to safe values. The drive motor 9 is switched off before the drive torque of the drive motor 9 increases to values which can lead to the cow suffering slight wounds or worse. If, for example, the tail of a cow becomes stuck in the rotating brush 14, the drive torque of the drive motor 9 is still sufficiently small so that there is no risk of injuries. After the drive motor 9 has been switched off, the cow can easily free itself from the brush 14. In this case, the brush 14 may be turned back slightly by the muscular power exerted by the cow, optionally supported by a driving of the brush 14 controlled by the control system in this opposite rotation direction, as described above.

Thus, the brush device 1 according to the invention differs significantly from the cow brush known from US 2014/0090607 A1, which does have an electronic overload protection, but exerts a significantly greater drive torque on the brush during operation. According to the invention, the drive torque supplied by the drive motor 9 remains so small at all times that the brush 14 can be held stationary and turned back by means of muscular power of the cow and/or an individual without causing serious injury.

The invention is not limited to the exemplary embodiment illustrated in the figures. For example, a brush device according to the invention may comprise a single-phase motor with an on/off-switch instead of a three-phase motor with a frequency controller. In this case, the single-phase motor does not supply a controlled drive torque, but a predetermined, fixed drive torque. In this case, the drive torque according to the invention is also such that the brush can be turned back by means of muscular power of the animal and/or an individual counter to the driven rotation direction while said drive torque is being supplied by the drive motor.

The invention claimed is:

1. A brush device for brushing an animal, comprising:
   a rotatable brush; and
   an electric drive motor configured to supply a drive torque for rotatably driving the rotatable brush in at least one rotation direction,
   wherein the rotatable brush can be turned back by a first external torque applied counter to the driven rotation direction while said drive torque is being supplied by the electric drive motor,
   a control system configured to observe the drive torque, wherein the control system is configured to control an amount of energy supplied to the electric drive motor during operation on the basis of the drive torque,
   wherein the control system is configured to switch off the electric drive motor or to reverse the driven rotation direction of the rotatable brush determined by the electric drive motor if the supplied drive torque exceeds a predetermined threshold value or after said predetermined threshold value is continuously exceeded for a predetermined period, and
   wherein said predetermined threshold value is less than the first external torque so that the rotatable brush can be turned back counter to the driven rotation direction while said drive torque is being supplied by the electric drive motor.

2. The brush device according to claim 1, wherein the drive torque supplied by the electric drive motor is smaller than 60 Nm.

3. The brush device according to claim 1, wherein said predetermined threshold value is set such that the electric drive motor is switched off or the driven rotation direction of the rotatable brush determined by the electric drive motor is reversed if the drive torque supplied by the electric drive motor becomes greater than or, for a predetermined period, is greater than 60 Nm.

4. The brush device according to claim 1, wherein the control system is provided with a sensor for observing whether an animal engages with the rotatable brush, and
   wherein the control system is configured to switch on the electric drive motor as soon as said sensor has observed that an animal engages with the rotatable brush.

5. The brush device according to claim 1, wherein the rotatable brush comprises a driven brush shaft,
   wherein the electric drive motor comprises an output drive shaft, and
   wherein the output drive shaft of the electric drive motor and the driven brush shaft of the rotatable brush are connected to each other by a transmission device configured such that rotation of the output drive shaft can be transmitted to the driven brush shaft of the rotatable brush and vice versa.

6. An animal shed, comprising at least one brush device according to claim 1.

7. The brush device according to claim 1, wherein the control system switches the drive motor off for a predetermined waiting period when the control system has switched off and/or turned back the drive motor after the threshold value for the drive torque was exceeded.

8. The brush device according to claim 1, wherein the electric drive motor has a variable speed of rotation,
   wherein the drive torque of the electric drive motor is determined based on a speed of rotation of the electric drive motor during operation,
   wherein a value corresponding to a desired speed of rotation of the electric drive motor during operation is input into the control system, and
   wherein the control system is configured to compare said drive torque corresponding to the speed of rotation to said value and to control the amount of energy supplied to the electric drive motor during operation on the basis of said comparison.

9. The brush device according to claim 8, wherein the control system is configured to accelerate the electric drive motor from a standstill to a desired speed of rotation of the electric drive motor during operation when the electric drive motor is being switched on for a predetermined acceleration period between 1-5 seconds.

10. The brush device according to claim 8, wherein the control system is provided with a sensor for observing whether an animal engages with the rotatable brush, and wherein the control system is configured to switch on the electric drive motor as soon as said sensor has observed that an animal engages with the rotatable brush.

11. The brush device according to claim 1, wherein the rotatable brush is rotatable about a substantially horizontal brush axis.

12. The brush device according to claim 11, wherein the rotatable brush is suspended from a swivel arm which is pivotable about a swivel axis which runs substantially parallel to the horizontal brush axis,
- wherein the swivel arm has a rest position, in which the swivel arm extends substantially vertically, and
- wherein the swivel arm is movable from the rest position by lifting the brush.

13. The brush device according to claim 12, wherein the electric drive motor is configured to rotatably drive the rotatable brush in both rotation directions,
- wherein the control system is provided with at least one sensor for observing the pivoting direction of the swivel arm from the rest position during lifting of the rotatable brush, and
- wherein the control system is configured to control the electric drive motor in order to rotatably drive the rotatable brush in the rotation direction counter to the observed pivoting direction of the swivel arm.

14. A method for brushing an animal, comprising the steps of:
- rotatably driving a rotatable brush in at least one rotation direction by a drive torque supplied by an electric drive motor; and
- setting the drive torque supplied by the electric drive motor in such a manner that the brush can be turned back by a first external torque counter to the driven rotation direction while said drive torque is being supplied by the electric drive motor,
- wherein the electric drive motor is connected to a control system configured to observe the drive torque,
- wherein the control system is configured to control an amount of energy supplied to the electric drive motor during operation on the basis of the drive torque,
- wherein the control system is configured to switch off the electric drive motor or to reverse the driven rotation direction of the rotatable brush determined by the electric drive motor if the supplied drive torque exceeds a predetermined threshold value or after said predetermined threshold value is continuously exceeded for a predetermined period, and
- wherein said predetermined threshold value is less than the first external torque so that the rotatable brush can be turned back counter to the driven rotation direction while said drive torque is being supplied by the electric drive motor.

* * * * *